Sept. 10, 1968 G. O. McCLURG ET AL 3,401,332
MAGNETIC LEAKAGE FIELD AND EDDY CURRENT FLAW DETECTION SYSTEM
Filed Nov. 12, 1963 2 Sheets-Sheet 1

INVENTORS
Glenn O. McClurg
Henry N. Nerwin
Heino Pujdak by
Hill, Sherman, Meroni, Gross & Simpson ATTORNEYS Sept. 10, 1968  G. O. McCLURG ET AL  3,401,332
MAGNETIC LEAKAGE FIELD AND EDDY CURRENT FLAW DETECTION SYSTEM
Filed Nov. 12, 1963  2 Sheets-Sheet 2

INVENTORS
Glenn O. McClurg
Henry N. Nerwin
Heino Puidak
by
Hill, Sherman, Meroni, Gross & Simpson  ATTORNEYS

United States Patent Office 3,401,332
Patented Sept. 10, 1968

3,401,332
MAGNETIC LEAKAGE FIELD AND EDDY
CURRENT FLAW DETECTION SYSTEM
Glenn O. McClurg, Evanston, Henry N. Nerwin, Mount Prospect, and Heino Puidak, Chicago, Ill., assignors to Magnaflux Corporation, Chicago, Ill., a corporation of Delaware
Filed Nov. 12, 1963, Ser. No. 322,614
6 Claims. (Cl. 324—37)

This invention relates to a system for nondestructive testing workpieces to detect flaws and more particularly to a system which is capable of rapidly determining with a high degree of precision and with high reliability the location and character of flaws including flaws in interior as well as exterior regions of the workpiece.

Leakage field inspection systems are known using the detection of magnetic field variations produced in the regions of flaws in a workpiece. Such leakage fields may be produced by applying a magnetic field to the workpiece during the testing operation, or by using a workpiece which has been previously magnetized and which is of a material such as to have a residual magnetism which is substantially uniform except as distorted by the leakage fields in the region of flaws.

Eddy current inspection systems are also known wherein a detection means, usually in the form of a coil, is disposed adjacent a workpiece and extended with an alternating current and wherein flaw-produced changes in impedance of the detection means are measured to develop an electrical signal indicating the flaws.

Both of such systems are very useful and have been used extensively, but it has been found that each has certain disadvantages. For example, the leakage field system is comparatively insensitive to certain types of flaws, particularly narrow cracks in the workpiece and also defects referred to as "roll-ins" wherein pits in the surface of a workpiece are filled in with extraneous matter in a manner to greatly reduce the effective leakage field. The eddy current system is very insensitive to flaws below the surface of the workpiece and is also insensitive to pits in the surface of the workpiece.

This invention provides a testing system in which the disadvantages of such prior art systems are substantially eliminated and in which additional advantages are obtained. According to this invention, both leakage field and eddy current detection means are provided and are located adjacent one another and adjacent the surface of the workpiece. The leakage field detection means operates to develop a first electrical signal in response to leakage fields, and the impedance of the eddy current detection means is measured while exciting it from an oscillator, to develop a second electrical signal. Such first and second electrical signals are then simultaneously indicated and compared in a manner to determine the location and character of flaws in the workpiece with a high degree of accuracy. This system is particularly advantageous when used in an arrangement in which the entire workpiece, or a substantial portion thereof, is scanned in a predetermined regular pattern, in that the testing is performed very rapidly and the results of the tests are readily correlated.

An important feature of the invention is in the use of a multi-channel recorder to provide a record of the results of the testing operation which may be subsequently examined, thereby increasing the speed of the testing operation.

Another important feature is in the disposition of the leakage field detection means closer to the workpiece than the eddy current detection means to provide increased sensitivity to internal defects, while minimizing interference between operation of the two detection means.

A further important feature of the invention is in the application of the system to the testing of pipe, the system being particularly advantageous in such use in that defects commonly occurring in pipe and especially ferrous pipe can be readily and accurately detected. The term pipe is used herein in a generic sense to include all forms of tubular or hollow or partially hollow articles which may have inside walls or surfaces not readily accessible for testing.

Other important features of the invention reside in the incorporation of the leakage field and eddy current inspection means in a single probe unit and in the construction of the probe unit in a manner to obtain improved response characteristics while further minimizing interference.

This invention contemplates other and more specific objects, features and advantages which will become more fully apparent from the following detailed description taken in conjunction with the accompanying drawings which illustrate the preferred embodiments and in which.

Figure 1:
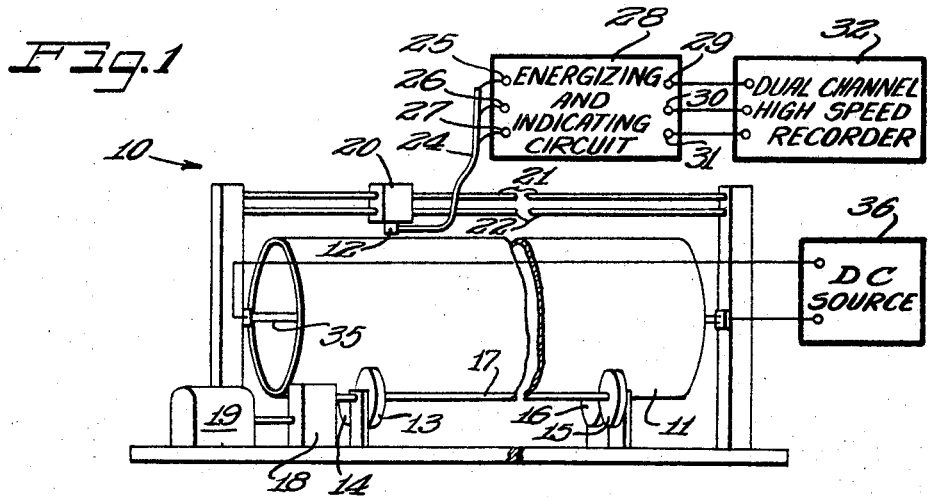
FIGURE 1 is a diagrammatic perspective view of a system constructed according to the principles of this invention and specifically designed for the testing of pipe.

Reference numeral 10 generally designates a flaw detection system constructed according to the principles of this invention and particularly designed for the inspection of a section of pipe 11. As diagrammatically illustrated, an inspection proble unit 12 is disposed adjacent the upper surface of the pipe 11 while the pipe 11 is rotated, the pipe 11 being supported on rollers 13, 14, 15 and 16, with rollers 13 and 15 being disposed on a shaft 17 driven through a reduction unit 18 from a motor 19.

The probe unit 12 is preferably movable longitudinally, parallel to the axis of the pipe 11, so as to scan the entire surface of the pipe, and for this purpose it is carried on a support 20 which is journalled on a pair of rods 21 and 22 parallel to the pipe axis, and one of the rods may be a lead screw driven by means not shown for effecting the longitudinal movement of the probe unit 12.

The probe unit 12 has separate coils, one for responding to leakage fields and the other for eddy current inspection, the coils being connected through a cable 24 to input terminals 25, 26 and 27 of an energizing and indicating circuit 28, which may have output terminals 29, 30 and 31 connected to a recorder 32.

To apply a magnetic field to the pipe 11 in a manner to develop leakage fields at defects therein, a conductor 35 extends through the pipe 11 and the opposite ends thereof are connected to terminals of a DC source as diagrammatically illustrated. The DC source 36 could be a battery, or preferably a rectifier connected to an AC source, supplying either half wave or full wave rectified current, with or without filtering.

Figure 2:
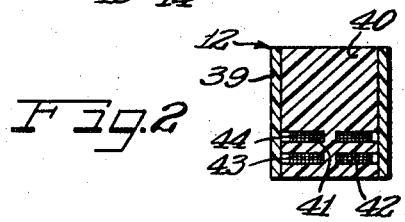
FIGURE 2 is a cross-sectional view, on an enlarged scale, of a probe unit of the system of FIGURE 1.

FIGURE 2 is a sectional view on an enlarged scale through the probe unit 12. As shown, the unit 12 comprises an outer casing 39 of an illustrated dielectric material with a generally cylindrical coil support form 40 therein. The form 40 is also of an insulating dielectric material and has two axially spaced annular grooves 41 and 42 in which coils 43 and 44 are wound. Coil 43 is closest to an end 45 of the form 40 which is disposed adjacent the surface of the pipe 11, and serves as a leakage field inspection coil, while coil 44 which is further away serves as the eddy current coil. This is an important feature because the leakage field gradient decreases rapidly when the search coil is displaced from the surface of the workpiece, particularly in response to defects below the surface of the workpiece, such as defects in the internal surface of the pipe 11. On the other hand, an eddy current inspection coil is quite sensitive in response to defects close to the surface of the workpiece even when spaced a substantial distance from the surface. Accordingly, by locating the coils in the manner as shown, a very sensitive response is obtained with maximum discrimination between defects, and with minimum interference between the leakage field and eddy current testing.

Figure 3:
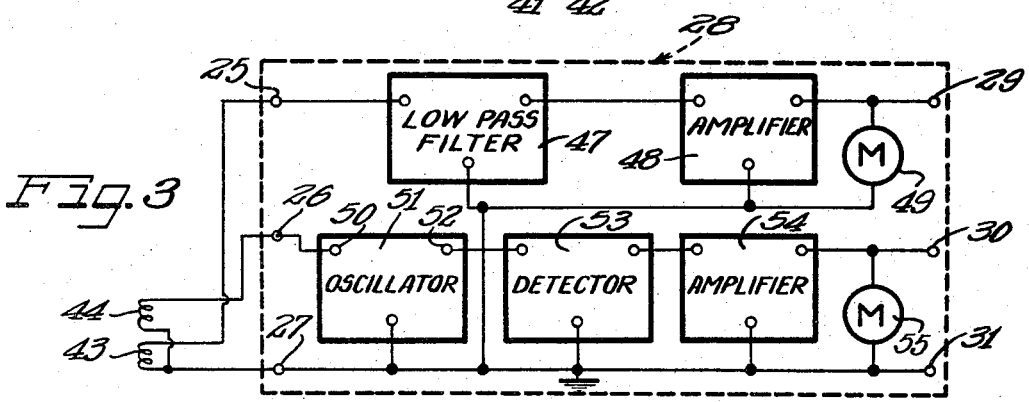
FIGURE 3 is an electrical block diagram of an energizing and indicating circuit of the system of FIGURE 1.

As shown in FIGURE 3, terminals of the coils 43 and 44 are respectively connected to terminals 25 and 26 of the energizing and indicating circuit 28 while the other terminals thereof are connected to the terminal 27, which is grounded. Terminal 25 is connected to the input of a lowpass filter 47 the output of which is connected to the input of an amplifier 48. The output of the amplifier 48 is connected to a meter 49 and also to the terminal 29 to be applied to one channel of the dual channel recorder 32. Amplified voltages, induced in the coil 43 from changes in flux produced by passage of defects under the coil 43, are thereby indicated on the meter 49 and recorded by the recorder 32.

Input terminal 26 is connected to one terminal 50 of an oscillator 51 having a second terminal 52 connected to an input of a detector 53. The output of the detector 53 is applied to the input of an amplifier 54 having an output connected to a meter 55 and also to the terminal 30 which is connected to the second channel of the dual channel recorder 32. In operation, changes in the load on the coil 44, caused by defects in the pipe, cause changes in the effective resistance and inductive reactance thereof to affect the output of the oscillator as measured at terminal 52. Such changes are detected by the detector 53, amplified by the amplifier 54, indicated on the meter 55 and recorded on the second channel of the recorder 32.

Figure 4:
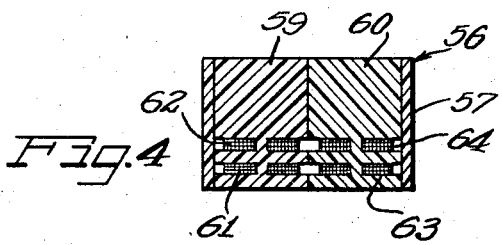
FIGURE 4 is a cross-sectional view of a modified probe unit constructed according to the principles of the invention.
Figure 5:
FIGURE 5 is an electrical diagram showing the interconnection of coils of the probe unit of FIGURE 4.

FIGURE 4 shows a modified probe unit 56 which comprises a casing 57 and two generally cylindrical coil support forms 59 and 60 therewithin each having the same form as the coil form 40 illustrated in FIGURE 2, coils 61 and 62 being disposed on form 59 and coils 63 and 64 being disposed on form 60. The lower coils 61 and 63, i.e., the coils located closest to the surface of the workpiece, operate as leakage field coils and as shown in FIGURE 5 they are connected in series aiding relation between conductors 65 and 66 which may be connected respectively to the terminals 25 and 27 of the energizing and indicating circuit 28. The other coils 62 and 64 are operated as eddy current coils and are connected in series opposed relation between the conductor 66 and a conductor 67 which may be connected to the input terminal 26 of the energizing and indicating circuit 28.

With this relationship, interference signals between the eddy current and leakage field channels are minimized and may be practically eliminated. An additional advantage is that a wider response curve is obtained and with the axes of the coils in a plane through the axis of the pipe 11, the scanning pitch can be increased substantially, by factor on the order of about 3.

Figure 6:
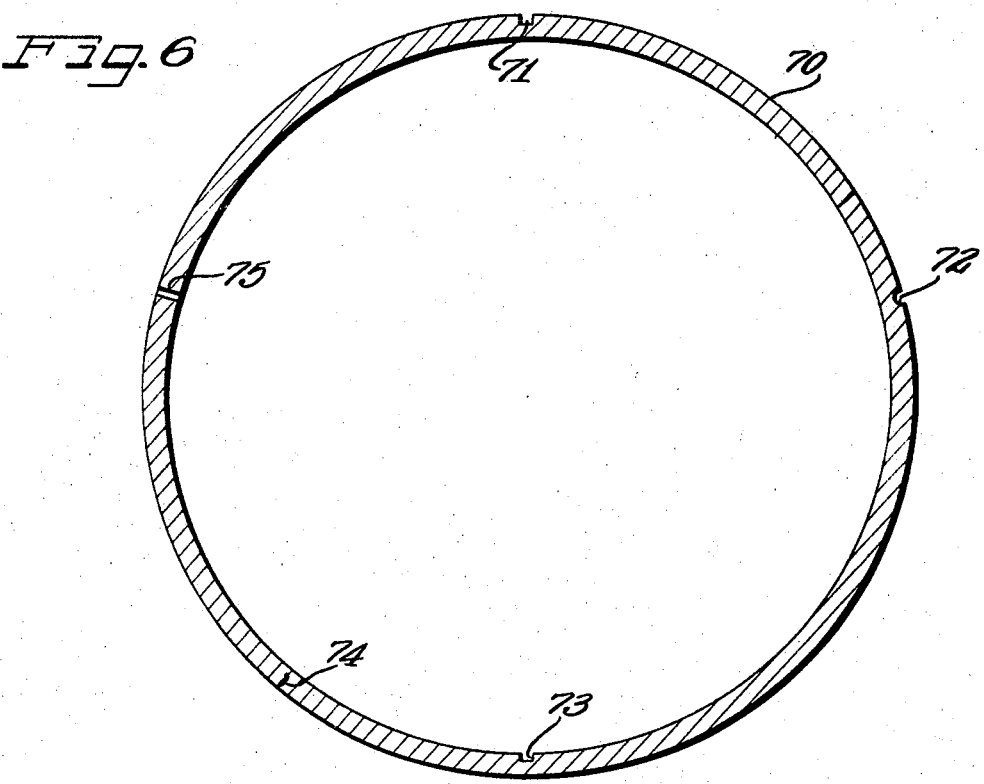
FIGURE 6 is a cross-sectional view of a section of pipe having representative types of defects therein.

FIGURE 6 is a cross-sectional view of a pipe 70 having representative types of defects therein. In particular, the pipe 70 has an axially extending seam 71 milled in the outer surface thereof, a roll-in defect 72 at a position approximately 70° from the OD seam 71, an ID seam 73 milled in the internal surface of the pipe 70 at a position diametrically opposite the OD seam 71, a narrow crack 74 extending inwardly from the outer surface at a position approximately 30° from the ID seam 73, and a hole 75 drilled at a position approximately 70° from the OD seam 71. By way of illustrative example and not by way of limitation, the pipe 70 may have an outer diameter five and one-half inches and an inside diameter of four and seven-eighths inches and may be of a type referred to as "oil country type." The OD seam may be 0.006 inch wide and 0.015 inch deep, the ID seam 73 may also be 0.006 inch wide with a depth of about 10% of the wall thickness, or 0.03 inch, and the hole 75 may be a one-eighth inch diameter drilled hole, simulating a pit. The roll-in 71 may have a diameter and depth on the order of 0.125 inch, a roll-in being a pit which is filled in with extraneous matter in a manner such that the leakage field created thereby is greatly reduced as compared to a pit of the same dimension, while the sensitivity of the eddy current detection means is increased substantially over a pit of the same dimensions.

Figure 7:
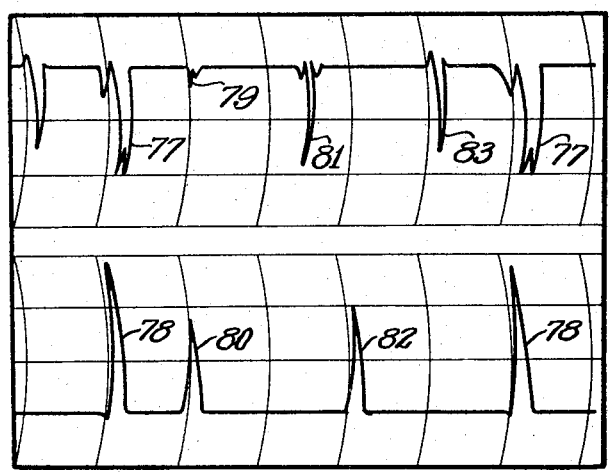
FIGURE 7 is a view illustrating the recorded traces obtained while testing of the pipe of FIGURE 6 with the apparatus of this invention.

FIGURE 7 shows the record obtained from the dual channel recorder 32 from testing of the pipe 70. The upper portion shows a record of leakage field signals, the downward extent of the indication being proportional to the strength of the leakage field. The lower portion shows the record of the eddy current signal, the upper extent of the indication being proportional to the changes in the output of the eddy current channel.

As shown, the OD seam 71 produces both a large leakage field indication 77 and a large eddy current indication 78. The roll-in 72 produces a comparatively small leakage field indication 79 and a comparatively large eddy current indication 80. The ID seam 73 produces a comparatively large leakage field indication 81 with no eddy current indication. The crack 74 produces no leakage field indication but produces a large eddy current indication 82. The drilled hole 75 (simulating a pit) produces a comparatively large leakage field indication 83, but no eddy current indication.

It will be apparent that the position of the defects may be accurately located and with the simultaneous recording of the indication adjacent one another on a single record, the character of the defects is readily and accurately determined, to obtain results which cannot be obtained otherwise.

It should be noted that the same general results can be obtained using only the meters 49 and 55, but with the high speed recorder 32, the workpieces can be very rapidly inspected and a permanent record is obtained which can later be inspected and studied to the extent necessary.

It will be understood that modifications and variations may be effected without departing from the spirit and scope of the novel concepts of this invention.

We claim as our invention:
1. In a system for detecting flaws in a workpiece having a unidirectional magnetic field therein, eddy current testing means arranged to induce an AC field in the workpiece and including a first sensing probe adjacent a portion of the workpiece to detect the effects of eddy currents in said portion of the workpiece, said eddy current testing means being arranged to produce a first electrical signal in response to flaws in said portion of the workpiece, leakage field testing means including a second sensing probe disposed closely adjacent said portion of the workpiece to simultaneously detect changes in said unidirectional magnetic field adjacent said portion of the workpiece and to produce a second electrical signal in response to flaw induced leakage field changes, and means for simultaneously indicating and comparing said first and second electrical signals to determine the location and characteristics of flaws in said portion of the workpiece, said first and second sensing probes comprising first and second coils respectively on a common axis generally transverse to the adjacent surface portion of the workpiece.

2. In a system as defined in claim 1, said first and second sensing probes comprising third and fourth coils disposed on a common axis generally parallel and closely adjacent to the axis of said first and second coils, said third coil being connected in series-opposed relation with said first coil and said fourth coil being connected in series-aiding relation with said second coil.

3. In a system as defined in claim 1, said second coil being disposed closer to said certain portion of the workpiece than said first coil.

4. In a system as defined in claim 1, means for effecting relative movement between said probes and said workpiece.

5. In a system as defined in claim 1, means for developing in the workpiece during the testing of the workpiece said unidirectional magnetic field which field is substantially uniform except as distorted by leakage fields across flaws therein.

6. In a system as defined in claim 5, said workpiece being a pipe, and said magnetic field developing means comprising a DC source, and a conductor extending longitudinally through said pipe and connected at its opposite ends to said DC source to apply said magnetic field to said pipe.

References Cited

UNITED STATES PATENTS

| | | | |
|---|---|---|---|
| 1,946,196 | 2/1934 | Drake et al. | 324—37 |
| 2,729,785 | 1/1956 | Keevil | 324—37 |
| 2,995,701 | 8/1961 | Lloyd | 324—37 |

RUDOLPH V. ROLINEC, *Primary Examiner.*

R. J. CORCORAN, *Assistant Examiner.*